US012725842B2

(12) United States Patent
Zhu et al.

(10) Patent No.: US 12,725,842 B2
(45) Date of Patent: Sep. 1, 2026

(54) METHOD FOR DETECTING LITHIUM PRECIPITATION OF BATTERY AND RELATED APPARATUS

(71) Applicant: CONTEMPORARY AMPEREX TECHNOLOGY (HONG KONG) LIMITED, Fujian (CN)

(72) Inventors: Cuicui Zhu, Ningde (CN); Jijun Zhang, Ningde (CN); Shaofei Wang, Ningde (CN); Yimin Wei, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 107 days.

(21) Appl. No.: 18/824,089

(22) Filed: Sep. 4, 2024

(65) Prior Publication Data

US 2024/0429474 A1 Dec. 26, 2024

Related U.S. Application Data

(63) Continuation of application No. PCT/CN2022/124531, filed on Oct. 11, 2022.

(51) Int. Cl.
*H01M 10/42* (2006.01)

(52) U.S. Cl.
CPC ............................... *H01M 10/4285* (2013.01)

(58) Field of Classification Search
CPC .... H01M 10/4285; H01M 10/42; Y02E 60/10
See application file for complete search history.

(56) References Cited

U.S. PATENT DOCUMENTS

2021/0270908 A1* 9/2021 Masuda ............... G01R 31/392

FOREIGN PATENT DOCUMENTS

| | | | | |
|---|---|---|---|---|
| CN | 109164390 A | * 1/2019 | ............... | G01L 5/00 |
| CN | 111273180 A | 6/2020 | | |
| CN | 111610451 A | 9/2020 | | |
| CN | 111624497 A | * 9/2020 | ............... | G01L 5/00 |
| CN | 112363063 A | * 2/2021 | ........... | G01R 31/385 |
| CN | 115144781 A | 10/2022 | | |
| JP | 2013020826 A | * 1/2013 | | |

(Continued)

OTHER PUBLICATIONS

Gong, Wenjun, and et al. "Life prediction of lithium ion batteries for electric vehicles based on gas production behavior model." In 2017 International Conference on Sensing, Diagnostics, Prognostics, and Control (SDPC), pp. 275-280. IEEE, 2017 (Year: 2017).*

(Continued)

*Primary Examiner* — Douglas Kay
(74) *Attorney, Agent, or Firm* — K&L Gates LLP

(57) ABSTRACT

Embodiments of the present application provide a method for detecting lithium precipitation of a battery and a related apparatus. The method may include: acquiring pressure data of a predetermined position of the battery; and detecting lithium precipitation of the battery according to the pressure data and reference pressure data, the pressure data including actually measured pressure data of the battery, and the reference pressure data including pressure data related to a predetermined amount of lithium precipitation of the battery under a predetermined condition.

12 Claims, 3 Drawing Sheets

(56) References Cited

FOREIGN PATENT DOCUMENTS

| | | | | |
|---|---|---|---|---|
| JP | 2014154399 | A | * | 8/2014 |
| JP | 2015056352 | A | * | 3/2015 |

OTHER PUBLICATIONS

The extended European search report received in the counterpart EP application 22961662.8, dated Mar. 18, 2025, 8 pages.

International Search Report for PCT Application PCT/CN2022/124531, mailed Jun. 13, 2023.

* cited by examiner

METHOD FOR DETECTING LITHIUM PRECIPITATION OF BATTERY AND RELATED APPARATUS

CROSS REFERENCE TO RELATED APPLICATION

This application is a continuation of International Application No. PCT/CN2022/124531, filed on Oct. 11, 2022. The disclosure of the aforementioned application is hereby incorporated by reference in its entirety.

TECHNICAL FIELD

The present application relates to the field of new energy technology, and in particular to a method, system, apparatus, storage medium, and computer program product for detecting lithium precipitation of a battery.

BACKGROUND

In recent years, with rapid development of new energy technology, application of lithium ion battery is increasingly popular. How to ensure operation safety of lithium ion battery has always been one of key research directions in the field. However, lithium precipitation is one of reasons affecting battery operation safety.

SUMMARY

Embodiments of the present application provide a method, system, apparatus, storage medium, and computer program product for detecting lithium precipitation of a battery, aiming to provide a solution for detecting the lithium precipitation based on pressure data.

In one aspect, the present application provides a method for detecting lithium precipitation of a battery, and the method may include:

- acquiring pressure data of a predetermined position of the battery; and
- detecting lithium precipitation of the battery according to the pressure data and reference pressure data;
- wherein the pressure data may include actually measured pressure data of the battery, and the reference pressure data may include pressure data related to a predetermined amount of lithium precipitation of the battery under a predetermined condition.

In these embodiments, by acquiring the actually measured pressure data of the predetermined position of the battery and in combination with the pressure data related to the predetermined amount of lithium precipitation of the battery under the predetermined condition, the lithium precipitation of the battery can be detected, and states related to the lithium precipitation of the battery can be determined. Accordingly, different from the solution in the related art for detecting whether the lithium precipitation of the battery occurs on the basis of an electrical signal, a solution for detecting lithium precipitation on the basis of the pressure data is presented, so that an accurate detection of the lithium precipitation of the battery is achieved by using the correlation between the pressure data and the lithium precipitation of the battery.

Optionally, the predetermined condition may include a predetermined temperature and a predetermined electricity amount; and the reference pressure data may include pressure data related to the predetermined amount of lithium precipitation of the battery under the predetermined temperature and the predetermined electricity amount.

In these embodiments, possible pressure difference under different temperatures and different electricity amounts is considered, so that by using a limitation of the predetermined condition, a pressure change due to lithium precipitation alone can be evaluated, thereby reducing an error in detecting lithium precipitation state.

Optionally, the detecting lithium precipitation of the battery according to the pressure data and reference pressure data may include:

- comparing the pressure data to the reference pressure data; and
- determining, under a condition that the pressure data is greater than the reference pressure data, that the battery is in a lithium precipitation state;
- determining, under a condition that the pressure data is less than or equal to the reference pressure data, that the battery is in a non-lithium precipitation state.

In these embodiments, the detection of the lithium precipitation of the battery is achieved according to the actually measured pressure data of a current predetermined position and the reference pressure data and based on the pressure change due to the lithium precipitation inside a cell, so that a solution for detecting and determining the lithium precipitation based on the pressure data is provided.

Optionally, the detecting lithium precipitation of the battery according to the pressure data and reference pressure data may include:

- comparing the pressure data to the reference pressure data; and
- detecting an amount of lithium precipitation of the battery based on a difference between the pressure data and the reference pressure data.

In these embodiments, an achievable solution is provided for obtaining the amount of lithium precipitation of the cell based on the pressure change of the battery at the predetermined position, so as to better achieve real-time monitoring of the lithium precipitation of the battery.

Optionally, the detecting an amount of lithium precipitation of the battery based on a difference between the pressure data and the reference pressure data may include:

searching for an amount of lithium precipitation corresponding to the difference between the pressure data and the reference pressure data from a functional relationship between a pressure variation and an amount of lithium precipitation. Accordingly, possible interference of predetermined conditions (for example, the position, the temperature, and the electricity amount of the battery) on the calculation of the amount of lithium precipitation can be eliminated, so that a calculation error in the amount of lithium precipitation is reduced with the accumulated amount of lithium precipitation obtained based on the pressure change due to the lithium precipitation alone.

In these embodiments, an optional and achievable solution is provided in how to obtain the accumulated amount of lithium precipitation of the battery according to the difference between the pressure data and the reference pressure data, so that an accurate test of the lithium precipitation based on the pressure data is achieved, thereby providing a reference basis for the operation state and subsequent use of the battery.

Optionally, the functional relationship between the pressure variation and the amount of lithium precipitation is obtained by:

- detecting an accumulated amount of lithium precipitation of a first test battery at different time instances and a pressure variation of a predetermined position of the first test battery when the accumulated amount of lithium precipitation is reached; and fitting the functional relationship between the pressure variation and the amount of lithium precipitation by using the accumulated amount of lithium precipitation of the first test battery at different time instances and the pressure variation of the predetermined position of the first test battery when the accumulated amount of lithium precipitation is reached.

In these embodiments, a process for establishing the functional relationship between the pressure variation and the amount of lithium precipitation is provided, so that an optional and achievable solution is provided for obtaining the current accumulated amount of lithium precipitation based on a difference in the pressure data, so as to achieve the accurate monitoring of the lithium precipitation of the battery.

Optionally, the predetermined position may include a plurality of predetermined positions, and each predetermined position corresponds to one reference pressure datum.

In these embodiments, difference in a plurality of predetermined positions of the battery due to the influence of the lithium precipitation of the battery is considered, so that the detection range of the lithium precipitation of the battery may be expanded, thereby achieving the detection of the lithium precipitation in a comprehensive and accurate way.

Optionally, the reference pressure data is obtained by:

establishing a data matrix of the pressure data related to the predetermined amount of lithium precipitation under a predetermined condition, the data matrix reflecting a correspondence relationship between the predetermined condition and the pressure data; and obtaining a corresponding reference pressure data from the data matrix based on an actual measurement condition.

In these embodiments, a process for acquiring the reference pressure data is provided, thereby providing a data support for a subsequent comparison using the actually measured pressure data of the predetermined position and the reference pressure data to achieve the detection of the lithium precipitation of the battery. In addition, the interference due to the predetermined conditions is eliminated, thereby improving detection accuracy of the lithium precipitation of the battery.

Optionally, the establishing a data matrix of the pressure data related to the predetermined amount of lithium precipitation under a predetermined condition may include:

collecting pressure data of a second test battery related to the predetermined amount of lithium precipitation under different predetermined conditions;

establishing, according to the pressure data under the different predetermined conditions, the data matrix of the pressure data related to the predetermined amount of lithium precipitation under the predetermined condition.

In these embodiments, a process for establishing the data matrix is provided, thereby providing a data base for subsequently obtaining pressure data under the different predetermined conditions.

Optionally, the predetermined position of the battery is inside a battery cell.

In these embodiments, the position where the pressure data of the battery is measured is provided inside the battery cell, so that the pressure change due to the influence of the lithium precipitation can be detected as early as possible, and an error in pressure detection and lithium precipitation detection can be reduced, which may also be applied to a battery including a hard shell cell, a soft package cell, a cylindrical cell and the like, and may have a wide range of application.

In another aspect, the present application provides a system for detecting lithium precipitation of a battery, and the system may include:

an acquisition module which may be configured to acquire pressure data of a predetermined position of the battery; and a detection module which may be configured to detect lithium precipitation of the battery according to the pressure data and reference pressure data;

wherein the pressure data may include actually measured pressure data of the battery, and the reference pressure data may include pressure data related to a predetermined amount of lithium precipitation of the battery under a predetermined condition.

In yet another aspect, the present application provides an apparatus for detecting lithium precipitation of a battery which may include a processor, a memory and programs or instructions stored on the memory and executable on the processor, the programs or the instructions, when executed by the processor, implementing steps of the method for detecting lithium precipitation of the battery according to the above aspects.

In yet another aspect, the present application further provides an apparatus for detecting lithium precipitation of a battery configured to perform the steps of the method for detecting lithium precipitation of the battery according to the above aspects.

In yet another aspect, the present application further provides a readable storage medium having programs or instructions stored thereon, the programs or the instructions, when executed by the processor, implementing the steps of the method for detecting lithium precipitation of the battery according to the above aspects.

In yet another aspect, the present application further provides a computer program product executable by a processor to implement the steps of the method for detecting lithium precipitation of the battery according to the above aspects.

The above description is merely an overview of the technical solutions of the present application. In order to make the technical means of the present application understood more clearly and implemented according to the contents of the description, and in order to make the above and other objects, features and advantages of the present application understood more obviously, specific detailed description of the present application are particularly provided below.

BRIEF DESCRIPTION OF THE DRAWINGS

The drawings required for explaining embodiments are described briefly below to illustrate the technical solutions of the embodiments of the present application more clearly. Obviously, the drawings described below illustrate merely some embodiments of the present application. Other figures can be obtained by those with ordinary skill in the art from those drawings without any inventive efforts.

DETAILED DESCRIPTION

Figure 1:
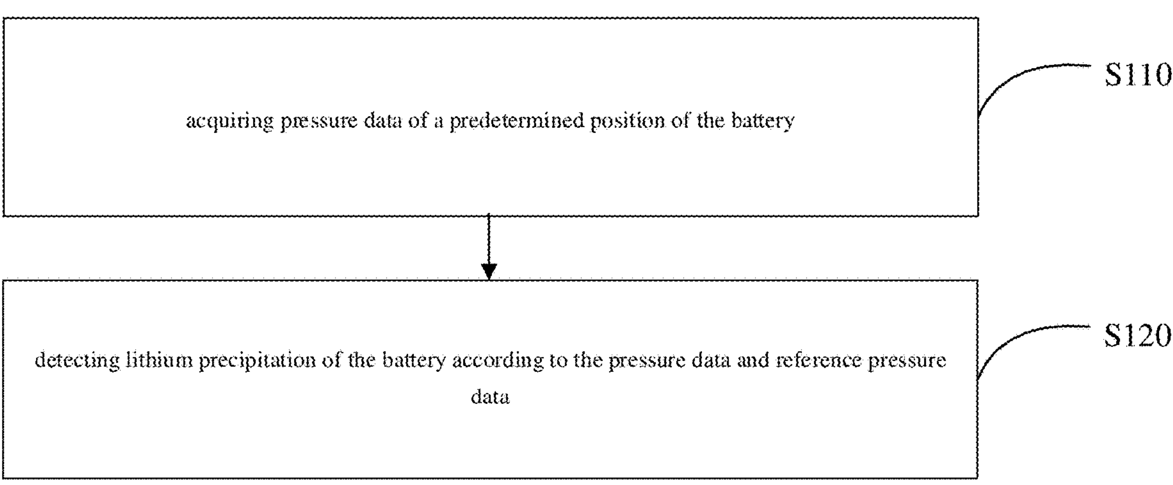
FIG. 1 is a flow chart of an embodiment of a method for detecting lithium precipitation of a battery according to the embodiments of the present application.

Embodiments of technical solutions of the present application will be described in detail below with reference to the drawings. Embodiments below are only for more clear illustration of the technical solutions of the present application, therefore are only used as examples, but cannot be used to limit the protection scope of the present application.

Unless otherwise defined, all technical and scientific terms used in the present application have the same meanings as commonly understood by those skilled in the technical field of the present application. The terms used in the present application are only for purposes of description of specific embodiments, and are not intended to limit the present application. The terms "comprise/include" and "have" in the description and claims and the above brief description of the drawings of the present application and any variations thereof are intended to cover non-exclusive inclusions.

The technical terms "first," "second" and the like in the description of the embodiments of the present application are only used to distinguish different objects, but should not be understood that they indicate or imply relative importance or imply the number, specific sequence or primary and secondary relationships of the technical features that they refer to. In the description of the embodiments of the present application, "a plurality of" means two or more, unless otherwise explicitly and specifically limited.

"An embodiment" mentioned in the present application means that particular features, structures or characteristics described in combination with the embodiments may be included in at least one embodiment of the present application. Appearances of the phrase in various places in the description are not necessarily all referring to the same embodiment, nor a separate or alternative embodiment that is mutually exclusive of other embodiments. It should be explicitly and implicitly understood by those skilled in the art that the embodiments described herein may be combined with other embodiments.

In the description of the embodiments of the present application, the term "a plurality of" means two or more (including two), similarly, "a plurality of groups" means two or more groups (including two groups), and "a plurality of sheets" means two or more sheets (including two sheets).

In the field of new energies, a power battery may be used as a main power source of a power consumption device (such as a vehicle, a ship, a spacecraft, and the like), and an energy storage battery may be used as a charging source of the power consumption device. The importance of both is self-evident. As an example but not as a limitation, in some application scenarios, the power battery may be a battery in the power consumption device, and the energy storage battery may be a battery in a charging device. For convenience of description, the power battery and the energy storage battery may be collectively referred to as a battery in the following description.

Lithium precipitation of the cell in the battery has always been one of the reasons affecting cell/battery safety. When a condition for the lithium precipitation is reached, lithium ions are reduced to lithium metal for precipitation and attached to the surface of the anode. Starting from the growing site, the lithium metal is accumulated gradually with cycling, and finally forms lithium dendrites. When the dendrites grow to a certain extent, the separator may be punctured to cause short circuit and failure of the battery, and even may cause serious safety problems such as combustion and explosion, which is a great potential risk in the use of the cell/battery.

When the detection of the lithium precipitation is performed in the related art, electrical signals are mostly used. For example, current, voltage and resistance are collected for analysis to determine whether lithium is precipitated from the battery.

However, in the process of designing and developing a battery, the inventors of the present application explored and found that when the lithium precipitation phenomenon occurs in the cell, an expansion occurs inside the cell, the inner pressure is increased and transmitted from inside to outside. Accordingly, a solution for detecting lithium precipitation based on pressure data of a predetermined position of the battery is designed where the pressure data of the predetermined position of the battery is acquired, and then the lithium precipitation of the battery is detected according to the pressure data and reference pressure data. Herein the pressure data include actually measured pressure data of the battery, and the reference pressure data includes pressure data related to a predetermined amount of lithium precipitation of the battery under a predetermined condition. Accordingly, an accurate detection of the lithium precipitation of the battery is achieved by using the correlation between the pressure data and the lithium precipitation of the battery, which is different from the related art.

Hereinafter, a method, system, apparatus, storage medium, and computer program product for detecting lithium precipitation of a battery provided in the embodiments of the present application will be described below. First, a method for detecting lithium precipitation of a battery provided in the embodiments of the present application will be described below.

With reference to FIG. 1, FIG. 1 shows a flow chart of an optional embodiment of a method for detecting lithium precipitation of a battery according to the embodiments of the present application. In the embodiment, the method for detecting the lithium precipitation of the battery may include following steps:

At S110, pressure data of a predetermined position of the battery is acquired.

At S120, lithium precipitation of the battery is detected according to the pressure data and reference pressure data.

Herein the pressure data may include actually measured pressure data of the battery, and the reference pressure data may include pressure data related to a predetermined amount of lithium precipitation of the battery under a predetermined condition.

The solution may be applied to the detection of the lithium precipitation of the battery including a hard shell cell, a soft package cell, or a cylindrical cell. The method for detecting the lithium precipitation of the battery may be applied to a battery management system, an electronic device or a processor for detecting lithium precipitation of the battery, or a device installed with a battery.

In some optional examples, a pressure sensor may be arranged at the predetermined position of the battery, and the actually measured pressure data of the predetermined position may be obtained accordingly. The predetermined position may be inside/outside the cell of the battery, and the predetermined position may be a position that is susceptible to strain due to the lithium precipitation.

The predetermined condition may be any parameter condition related to the lithium precipitation, and one or more predetermined conditions may be set. The predetermined condition may include at least one of a predetermined chemical system, a predetermined electricity amount, a predetermined temperature, and a predetermined charging current, or may further include other parameter conditions. On this basis, for example, the reference pressure data may include pressure data related to a predetermined amount of lithium precipitation of the battery under a predetermined chemical system and a predetermined electricity amount.

The reference pressure data may be experimental data measured by using a test battery, and may reflect a pressure condition of the predetermined position when the battery is in a non-lithium precipitation state (or a lithium precipitation state) under the predetermined condition. In actual use, the reference pressure data may be obtained by table lookup, or may be obtained directly from the relevant data involved in a previous lithium precipitation detection.

On the basis of obtaining the actually measured pressure data of the predetermined position and the reference pressure data, the reference pressure data may be compared to the pressure data of the predetermined position to detect the lithium precipitation of the battery, so that whether the lithium precipitation phenomenon of the battery occurs may be detected, and the accumulated amount of lithium precipitation when the lithium precipitation phenomenon of the battery occurs may also be known.

It should be noted that when the lithium precipitation phenomenon of the cell occurs, an expansion occurs inside the cell, the inner pressure is increased and transmitted from inside to outside, and when the predetermined amount of lithium precipitation is set to be relatively large, reference pressure data related to the predetermined amount of lithium precipitation may characterize corresponding pressure data in the lithium precipitation state. In contrast, when the predetermined amount of lithium precipitation is set to be relatively small, the reference pressure data related to the predetermined amount of lithium precipitation may represent the pressure data in the non-lithium precipitation state. The pressure data of the predetermined position of the battery is compared to the reference pressure data, so that it may be determined that the actually measured pressure data of the current predetermined position of the battery is more in line with the lithium precipitation state or the non-lithium precipitation state, thereby achieving a lithium precipitation test of the battery.

In the embodiment, by acquiring the actually measured pressure data of the predetermined position of the battery and in combination with the pressure data related to the predetermined amount of lithium precipitation of the battery under the predetermined condition, the lithium precipitation of the battery can be detected, and states related to the lithium precipitation of the battery can be determined. Accordingly, different from the solution in the related art for detecting, based on an electrical signal, whether the lithium precipitation of the battery occurs, a solution for detecting lithium precipitation based on the pressure data is presented, so that an accurate detection of the lithium precipitation of the battery is achieved by using the correlation between the pressure data and the lithium precipitation of the battery.

Based on the above embodiment, another embodiment of the method for detecting the lithium precipitation of the battery according to the present application is presented. In the embodiment, the predetermined condition may include a predetermined temperature and a predetermined electricity amount. Correspondingly, the reference pressure data may include pressure data related to the predetermined amount of lithium precipitation of the battery under the predetermined temperature and the predetermined electricity amount.

It should be noted that, when the cell in the battery has different electricity amounts, the anode electrode plate of the cell has different lithium intercalation states, which may cause different degrees of volume expansion, thereby interfering with the detection of the lithium precipitation. On the other hand, the cell has volume variations under different temperatures due to thermal expansion and contraction, which will interfere with the detection of the lithium precipitation.

Accordingly, compared to the foregoing embodiment, the embodiment of the present application limit that the predetermined condition includes the predetermined electricity amount and the predetermined temperature, and possible pressure difference under different temperatures and different electricity amounts is considered, so that by using a limitation of the predetermined condition, a pressure change due to lithium precipitation alone can be evaluated, thereby reducing an error in detecting lithium precipitation state.

Figure 2:
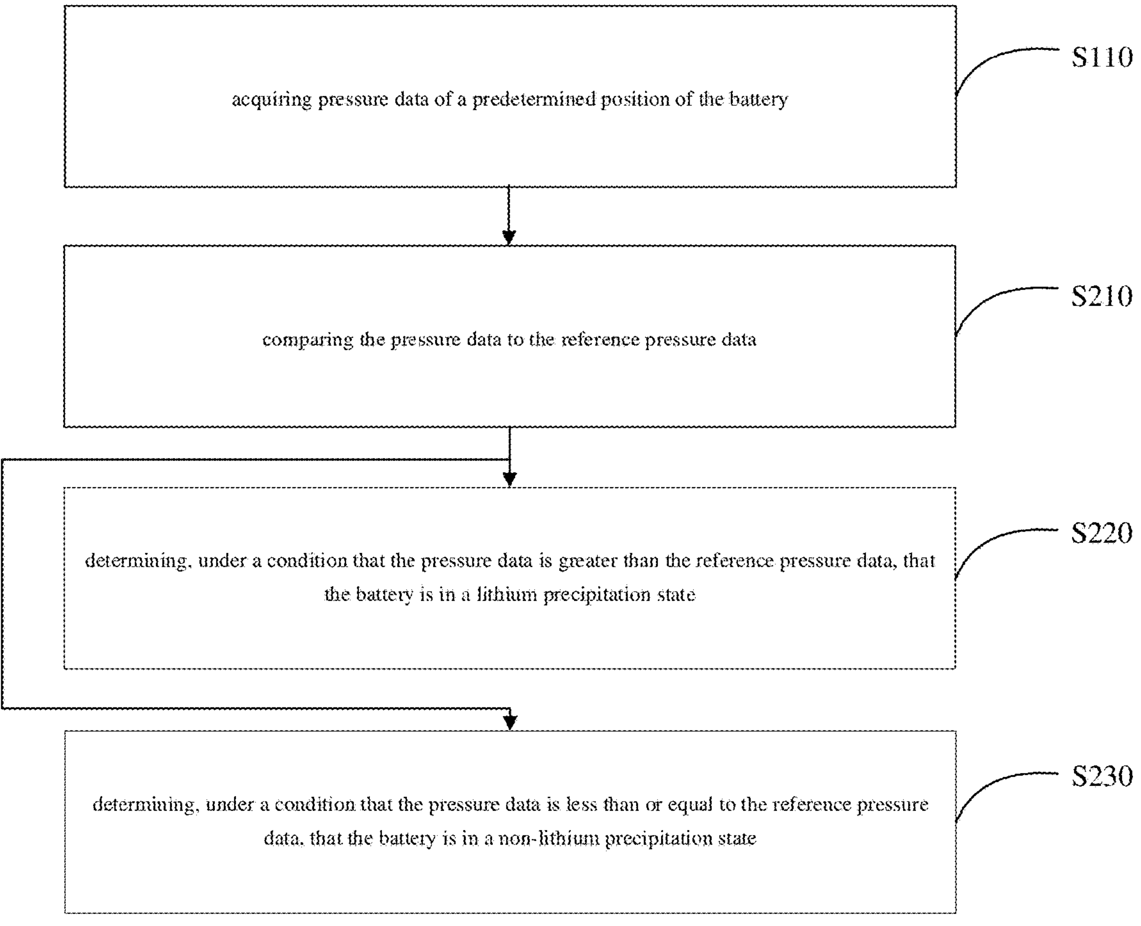
FIG. 2 is a flow chart of another embodiment of a method for detecting lithium precipitation of a battery according to the embodiments of the present application.

With reference to FIG. 2, based on the above embodiments, yet another embodiment of the method for detecting the lithium precipitation of the battery according to the present application is presented. In the embodiment, the detecting lithium precipitation of the battery according to the pressure data and reference pressure data in S120 may include S210, S220, and S230.

At S210, the pressure data is compared to the reference pressure data.

At S220, under a condition that the pressure data is greater than the reference pressure data, the battery is determined to be in a lithium precipitation state.

At S230, under a condition that the pressure data is less than or equal to the reference pressure data, the battery is determined to be in a non-lithium precipitation state.

The actually measured pressure data of the current predetermined position may be compared to the reference pressure data. Under this condition, the reference pressure data is pressure data when the predetermined amount of lithium precipitation is set to be relatively small, and the reference pressure data reflects the pressure data of the predetermined position when the battery is in the non-lithium precipitation state. Accordingly, when the actually measured pressure data of the current predetermined position is greater than the reference pressure data, it is proved that the lithium precipitation phenomenon occurs inside the battery cell, and the internal pressure is increased, so that an early warning for lithium precipitation may be performed; otherwise, it is proved that the lithium precipitation phenomenon does not occur in the cell in the battery in this state.

It should also be noted that whether the lithium precipitation of the battery occurs may be determined directly through a first difference between the actually measured pressure data of the current predetermined position and the reference pressure data, wherein the lithium precipitation of the cell in the battery is characterized by the first difference greater than a first threshold (for example, the first threshold is 0), and otherwise, no lithium precipitation of the cell in the battery is characterized.

In these embodiments, the detection of the lithium precipitation of the battery is achieved according to the actually measured pressure data of a current predetermined position and the reference pressure data and based on the pressure change due to the lithium precipitation inside a cell, so that a solution for detecting and determining the lithium precipitation based on the pressure data is provided.

Figure 3:
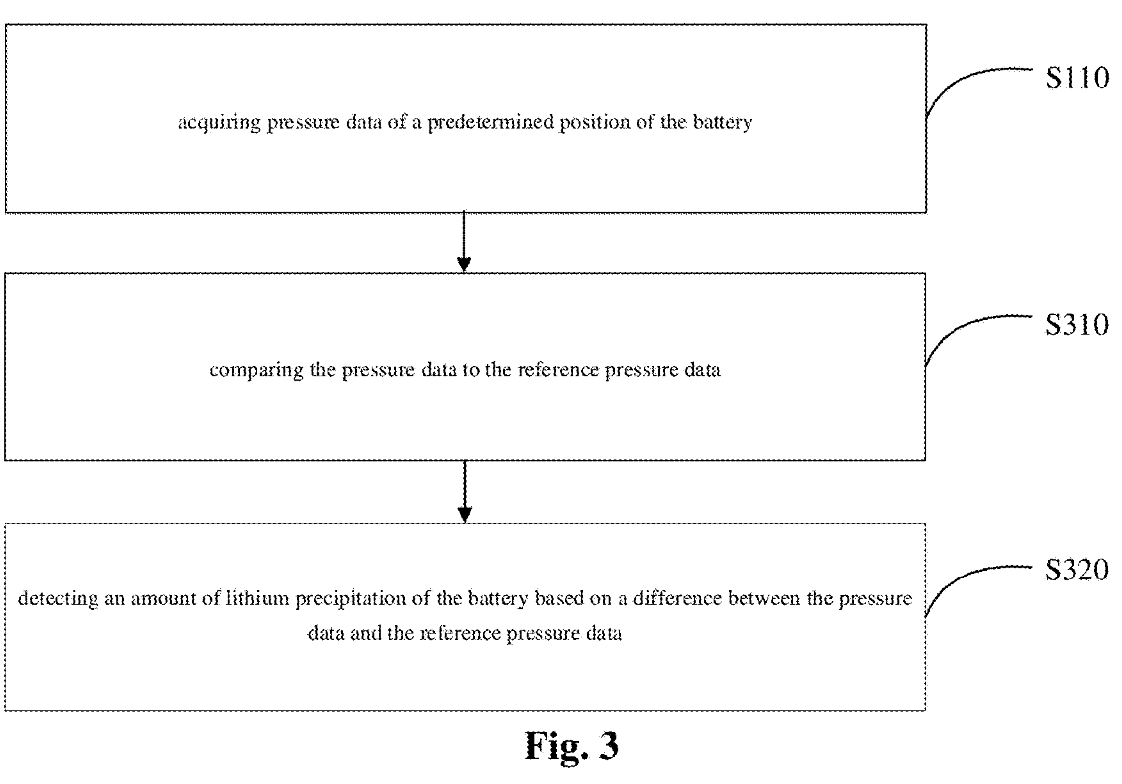
FIG. 3 is a flow chart of yet another embodiment of a method for detecting lithium precipitation of a battery according to the embodiments of the present application.

With reference to FIG. 3, based on the above embodiments, yet another embodiment of the method for detecting the lithium precipitation of the battery according to the present application is presented. In the embodiment, the detecting lithium precipitation of the battery according to the pressure data and reference pressure data in S120 may include S310 and S320.

At S310, the pressure data is compared to the reference pressure data.

At S320, an amount of lithium precipitation of the battery is detected based on a difference between the pressure data and the reference pressure data.

It may be understood that the difference between the pressure data and the reference pressure data reflects a pressure variation from the non-lithium precipitation state to the current state of the battery cell, and a cause of the pressure change is that lithium precipitation occurs inside the cell of the battery. Accordingly, a current amount of the lithium precipitation of the battery may be detected by calculating the difference.

Thus, an achievable solution is provided for obtaining the amount of lithium precipitation of the cell based on the pressure change of the battery at the predetermined position, so as to better achieve real-time monitoring of the lithium precipitation of the battery.

Figure 4:
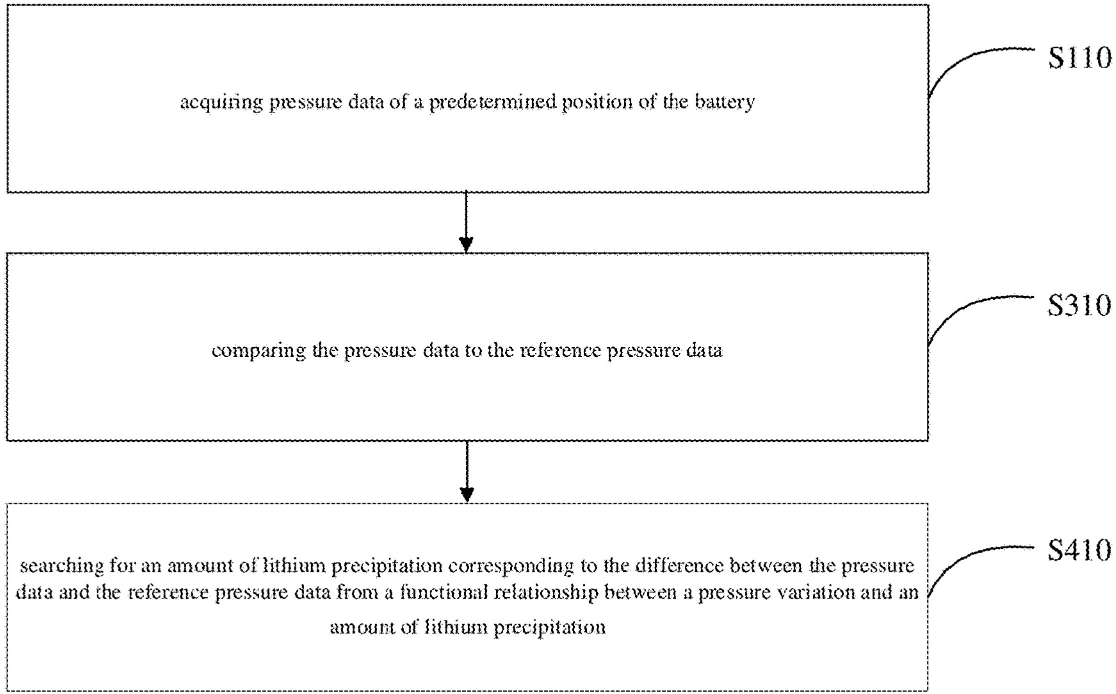
FIG. 4 is a flow chart of still another embodiment of a method for detecting lithium precipitation of a battery according to the embodiments of the present application.

With reference to FIG. 4, based on the above embodiments, still another embodiment of the method for detecting the lithium precipitation of the battery according to the present application is presented. In the embodiment, the detecting an amount of lithium precipitation of the battery based on a difference between the pressure data and the reference pressure data in S320 includes S410.

At S410, an amount of lithium precipitation corresponding to the difference between the pressure data and the reference pressure data is searched from a functional relationship between a pressure variation and an amount of lithium precipitation.

It should be noted that when the lithium precipitation phenomenon of the cell of the battery occurs, the expansion occurs inside the cell, the inner pressure is increased and transmitted from inside to outside, so that continuous occurrence of the lithium precipitation phenomenon of the battery causes the battery to have a pressure change from inside to outside. By setting the functional relationship between the pressure variation and the amount of lithium precipitation, a correlation between the accumulated amount of lithium precipitation of the battery under the predetermined condition and the pressure change of the predetermined position of the battery due to the influence of the lithium precipitation may be recorded. By taking the difference between the actually measured pressure data of the current predetermined position and the reference pressure data into the functional relationship as the pressure variation for calculation, the amount of lithium precipitation corresponding to the difference between the actually measured pressure data of the current predetermined position and the reference pressure data may be obtained.

In some optional examples, the functional relationship may also be set differently according to different predetermined conditions. In an example, the functional relationship may be set differently according to different predetermined positions, different temperatures and different electricity amounts. When an actually measured pressure data of a certain predetermined position and the reference pressure data under the predetermined temperature and the predetermined electricity amount of the battery are obtained, a functional relationship of the certain predetermined position under the corresponding predetermined temperature and the corresponding predetermined electricity amount of the battery can be found, and the accumulated amount of lithium precipitation associated with the pressure variation (that is, the difference) is calculated according to the functional relationship.

Accordingly, possible interference of predetermined conditions (for example, the position, the temperature, and the electricity amount of the battery) on the calculation of the amount of lithium precipitation can be eliminated, so that a calculation error in the amount of lithium precipitation is reduced with the accumulated amount of lithium precipitation obtained based on the pressure change due to the lithium precipitation alone.

In these embodiments, an optional and achievable solution is provided in how to obtain the accumulated amount of lithium precipitation of the battery according to the difference between the pressure data and the reference pressure data, so that an accurate test of the lithium precipitation based on the pressure data is achieved, thereby providing a reference basis for the operation state and subsequent use of the battery.

Based on the above embodiments, yet another embodiment of the method for detecting the lithium precipitation of the battery according to the present application is presented. In the embodiment, the functional relationship between the pressure variation and the amount of lithium precipitation is obtained by:

detecting an accumulated amount of lithium precipitation of a first test battery at different time instances and a pressure variation of a predetermined position of the first test battery when the accumulated amount of lithium precipitation is reached; and fitting the functional relationship between the pressure variation and the amount of lithium precipitation by using the accumulated amount of lithium precipitation of the first test battery at different time instances and the pressure variation of the predetermined position of the first test battery when the accumulated amount of lithium precipitation is reached.

A process for establishing the functional relationship between the pressure variation and the amount of lithium precipitation is provided in the embodiment, so that an optional and achievable solution is provided for obtaining the current accumulated amount of lithium precipitation based on a difference in the pressure data, so as to achieve the accurate monitoring of the lithium precipitation of the battery.

Herein the above first test battery may be a battery having a single test cell, the test cell may be a three-electrode cell including a reference electrode, and a C.B value of the test cell is less than a set C.B value. It should be noted that the C.B value is the ratio of capacities of the anode to the cathode opposite to each other of the cell, the set C.B value may be 1, and the C.B value of the test cell may be 0.5 or other value less than the set C.B value. Setting the C.B value of the test cell to be less than the set C.B value may indicate that the test cell is a cell where the lithium precipitation phenomenon occurs.

In some optional examples, the process for detecting the first test battery to obtain the accumulated amount of lithium precipitation at different time instances and the pressure variations respectively corresponding to different accumulated amounts of lithium precipitation may include: controlling the first test battery (or the first test cell) to be charged under different predetermined conditions (for example, different predetermined temperatures) so that the potential of negative electrode of the battery cell reaches a set potential, and obtaining initial pressure data and initial temperature data of the predetermined position of the first test battery when the set potential is reached and initial cell capacity of the first test battery. During continuous charging of the first test battery, the temperature data and the pressure data of the predetermined position of the first test battery at different time instances and cell capacity of the first test battery at different time instances are collected. According to the cell capacity of the first test battery at different time instances and the initial cell capacity, the accumulated amount of lithium precipitation of the first test battery at different time instances may be obtained. According to the pressure data of the predetermined position at different time instances and the initial pressure data, the pressure variations of the predetermined position at different time instances may be calculated, so that parameters of the pressure variations and the amount of lithium precipitation required for fitting the functional relationship are obtained.

In an example, through a low rate charge of 0.04C, the potential of the negative electrode of the cell in the first test battery may reaches a set potential, and the set potential may be 0V, or close to 0V. Under this condition, the temperature data, the pressure data of the first test battery at different predetermined positions, and the initial cell capacity of the cell in the first test battery may be recorded. When initial data of the first test battery at various predetermined positions is obtained, temperature data and pressure data of the first test battery at the various predetermined positions and the cell capacity of the first test battery may be continuously recorded at the same time interval or at different time intervals. For example, the time interval may be 1 minute.

It should also be noted that occurrence of the lithium precipitation phenomenon inside the cell may reduce the capacity of the cell, and thus after the interference from factors such as temperature is excluded, a capacity variation of the cell due to the lithium precipitation may be obtained according to the pressure variation, and the capacity variation of the cell is the current accumulated amount of the lithium precipitation of the cell.

In some optional examples, a process for fitting the function relationship between the pressure variation and the amount of lithium precipitation through the accumulated amount of lithium precipitation of the first test battery at different time instances and the pressure variation of the predetermined position of the first test battery when the accumulated amount of lithium precipitation is reached may include: assuming that the temperature data of the first test battery at the predetermined position X may be denoted as Tx, the pressure data at the predetermined position X may be denoted as Px, a cell capacity at different time instances may be denoted as C1, the initial cell capacity may be denoted as C0, which may be denoted in combination as (X, Tx, C) or (Tx, C), where $C=C1-C0$; $\Delta P$ is the (actual) pressure variation of the first test battery existed at the predetermined position X, where $\Delta P=Px-P0$; and P0 is the initial pressure data of the predetermined position X. The functional relationship may be obtained by fitting (X, Tx, C) or (Tx, C) to the pressure variation $\Delta P$.

The fitting process may be a linear fitting process. In an example, when (X, Tx, C) or (Tx, C) is linearly fitted to the pressure variation $\Delta P$, a plurality of linear fitting functions may be obtained, (X, Tx, C) or (Tx, C) may be taken into the obtained plurality of linear fitting functions for calculation to obtain a fitted pressure variation, and then the goodness-of-fit may be calculated according to the fitted pressure variation and an actual pressure variation, so that a linear fitting function with the goodness-of-fit greater than a certain value may be selected as the function.

The certain value may be 0.99 or 0.95. The goodness-of-fit may characterize the degree of linear correlation between the actual working condition data and the pressure variation, and the degree of deviation between the fitted pressure variation and the actual pressure variation. In some other examples, the goodness-of-fit may be replaced by variance, standard deviation, or the like.

Based on the above embodiments, yet another embodiment of the method for detecting the lithium precipitation of the battery according to the present application is presented. In the embodiment, the predetermined position may include a plurality of predetermined positions, and each predetermined position may correspond to one reference pressure datum.

In the embodiment, the plurality of predetermined positions are provided, and actually measured pressure data of different predetermined positions may be compared to reference pressure data corresponding to different predetermined positions, so that difference in the plurality of predetermined positions of the battery due to the influence of the lithium precipitation of the battery is considered, and the detection range of the lithium precipitation of the battery may be expanded, thereby achieving the detection of the lithium precipitation in a comprehensive and accurate way.

In an example, when actually measured pressure data of at least N predetermined positions is greater than reference pressure data of corresponding predetermined positions, the battery may be considered to be in the lithium precipitation state. N may be an integer greater than or equal to 1.

Based on the above embodiments, yet another embodiment of the method for detecting the lithium precipitation of the battery according to the present application is presented. In the embodiment, the reference pressure data is obtained by: establishing a data matrix of the pressure data related to the predetermined amount of lithium precipitation under a predetermined condition, the data matrix reflecting a correspondence relationship between the predetermined condition and the pressure data; and obtaining a corresponding reference pressure data from the data matrix based on an actual measurement condition.

A process for acquiring the reference pressure data is provided in the embodiment, thereby providing a data support for a subsequent comparison using the actually measured pressure data of the predetermined position and the reference pressure data to achieve the detection of the lithium precipitation of the battery.

It should be noted that the predetermined condition may be any parameter condition related to the lithium precipitation, so that the predetermined condition itself may have an effect on the obtaining of the pressure data. By establishing the data matrix, effects of different predetermined conditions may be considered. The actual measurement condition may be a real-time condition inside and outside the battery when the actually measured pressure data is obtained. Thus conditions inside and outside the battery corresponding to the reference pressure data match conditions inside and outside the battery corresponding to the actually measured pressure data, so that the interference due to the predetermined condition is eliminated, thereby improving the detection accuracy of the lithium precipitation of the battery.

Based on the above embodiments, yet another embodiment of the method for detecting the lithium precipitation of the battery according to the present application is presented. In the embodiment, a process for establishing a data matrix of the pressure data related to the predetermined amount of lithium precipitation under a predetermined condition may include: collecting pressure data of a second test battery related to the predetermined amount of lithium precipitation under different predetermined conditions; establishing, according to the pressure data under the different predetermined conditions, the data matrix of the pressure data related to the predetermined amount of lithium precipitation under the predetermined condition.

The predetermined electricity amount and the predetermined temperature are used as the predetermined condition for illustration. In an optional example, the second test battery may be controlled to charge and discharge under different test temperatures. During charging and discharging, the temperature data and the pressure data of the second test battery at the predetermined position at different time instances and electricity amounts of the second test battery at different time instances are collected. The electricity amounts of the second test battery at different time instances and the temperature data of the predetermined position at different time instances are processed together with the pressure data of the predetermined position at different time instances, so that the data matrix of the pressure data related to the predetermined amount of the lithium precipitation under the predetermined temperature and the predetermined electricity amount may be obtained.

Herein a C.B value of the cell in the second test battery is greater than the set C.B value. The C.B value of the cell in the second test battery being greater than the set C.B value indicates that the lithium precipitation phenomenon does not occur in the second test battery. In an example, the set C.B value may be 1 or 1.2.

The test temperature may be between minus twenty degrees Celsius and sixty degrees Celsius. During testing the processed data matrix, low-rate charging and discharging may be performed through 0.04C. When various data of the second test battery is obtained, an electricity amount of the second test battery and the temperature data and the pressure data at the predetermined position may be recorded at the same time interval or at different time intervals. For example, the time interval may be 1 minute.

In these embodiments, a process for establishing the data matrix is provided, thereby providing a data base for subsequently obtaining pressure data under the different predetermined conditions.

Based on the above embodiment, yet another embodiment of the method for detecting the lithium precipitation of the battery according to the present application is presented. In the embodiment, the predetermined position of the battery is inside the battery cell.

It should be noted that, when the lithium precipitation phenomenon occurs, expansion occurs inside the cell, the inner pressure is increased and transmitted from inside to outside. Thus a position where the pressure data of the battery is measured is provided inside the cell, so that pressure change due to the influence of the lithium precipitation can be detected as early as possible, and an error in pressure detection and lithium precipitation detection can be reduced, which may also be applied to a battery including a hard shell cell and the like, and may have a wide range of application.

The embodiments of the method for detecting the lithium precipitation of the battery according to the present application are described in detail with reference to FIG. 1 to FIG. 4. A system and apparatus for detecting the lithium precipitation of the battery according to the present application are described subsequently.

Figure 5:
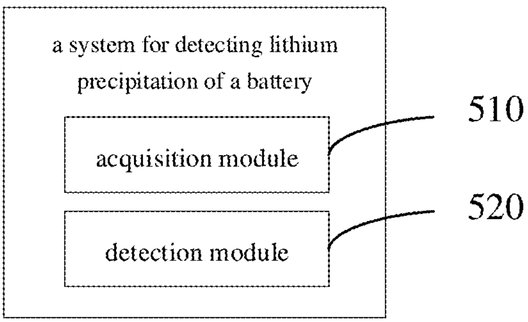
FIG. 5 is a schematic diagram of an optional module of an embodiment of a system for detecting lithium precipitation of a battery according to the embodiments of the present application.

With reference to FIG. 5, in an embodiment of a system for detecting the lithium precipitation of the battery according to the present application,

- an acquisition module 510 is configured to acquire pressure data of a predetermined position of the battery;
- a detection module 520 is configured to detect lithium precipitation of the battery according to the pressure data and reference pressure data; the pressure data including actually measured pressure data of the battery, and the reference pressure data including pressure data related to a predetermined amount of lithium precipitation of the battery under a predetermined condition.

Optionally, the predetermined condition includes a predetermined temperature and a predetermined electricity amount; and the reference pressure data includes pressure data related to the predetermined amount of lithium precipitation of the battery under the predetermined temperature and the predetermined electricity amount.

Optionally, the detection module may be configured to compare the pressure data to the reference pressure data; determine, under a condition that the pressure data is greater than the reference pressure data, that the battery is in a lithium precipitation state; determine, under a condition that the pressure data is less than or equal to the reference pressure data, that the battery is in a non-lithium precipitation state.

Optionally, the detection module may be configured to compare the pressure data to reference pressure data, and detect an amount of lithium precipitation of the battery based on a difference between the pressure data and the reference pressure data.

Optionally, the detection module may be configured to search for an amount of lithium precipitation corresponding to the difference between the pressure data and the reference pressure data from a functional relationship between a pressure variation and an amount of lithium precipitation.

Optionally, the functional relationship between the pressure variation and the amount of lithium precipitation is obtained by: detecting an accumulated amount of lithium precipitation of a first test battery at different time instances and a pressure variation of a predetermined position of the first test battery when the accumulated amount of lithium precipitation is reached; and fitting the functional relationship between the pressure variation and the amount of lithium precipitation by using the accumulated amount of lithium precipitation of the first test battery at different time instances and the pressure variation of the predetermined position of the first test battery when the accumulated amount of lithium precipitation is reached.

Optionally, the predetermined position includes a plurality of predetermined positions, and each predetermined position corresponds to one reference pressure datum.

Optionally, the reference pressure data is obtained by: establishing a data matrix of the pressure data related to the predetermined amount of lithium precipitation under a predetermined condition, the data matrix reflecting a correspondence relationship between the predetermined condition and the pressure data; and obtaining a corresponding reference pressure data from the data matrix based on an actual measurement condition.

Optionally, the establishing a data matrix of the pressure data related to the predetermined amount of lithium precipitation under a predetermined condition may include: collecting pressure data of a second test battery related to the predetermined amount of lithium precipitation under different predetermined conditions; establishing, according to the pressure data under the different predetermined conditions, the data matrix of the pressure data related to the predetermined amount of lithium precipitation under the predetermined condition.

Optionally, the predetermined position of the battery is inside the battery cell.

Figure 6:
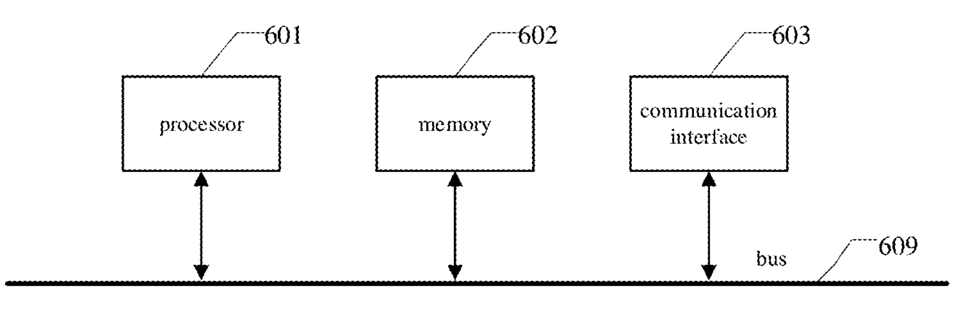
FIG. 6 is a schematic structural diagram of optional hardware of an apparatus for detecting lithium precipitation of a battery according to the embodiments of the present application. In the drawings, the drawings may not be drawn according to actual scale.

FIG. 6 shows a schematic structural diagram of hardware of an apparatus for detecting the lithium precipitation of the battery according to the embodiments of the present application. The apparatus for detecting the lithium precipitation of the battery may include a processor 601 and a memory 602 storing computer program instructions.

Specifically, the processor 601 may include a central processing unit (CPU), or an application specific integrated circuit (ASIC), or one or more integrated circuits configured to implement the embodiments of the present application.

The memory 602 may include a mass memory for storing data or instructions. As an example but not as a limitation, the memory 602 may include a hard disk drive (HDD), a floppy disk drive, a flash memory, an optical disk, a magneto-optical disk, a magnetic tape, or a universal serial bus (USB) drive or any combination of two or more thereof. When appropriate, the memory 602 may include a removable or non-removable (or fixed) medium. When appropriate, the memory 602 may be disposed inside or outside of a device. In a certain embodiment, the memory 602 may be a non-volatile solid state memory.

In particular embodiments, the memory may include a read only memory (ROM), a random access memory (RAM), a magnetic disk storage media device, an optical storage media device, a flash memory device, an electrical, optical or other physical/tangible memory storage device. Accordingly, the memory generally includes one or more tangible (non-transitory) computer-readable storage media (for example, memory devices) encoded with software which includes computer-executable instructions, and the software, when executed (for example, by one or more processors), is operable to perform the operations described with reference to the methods according to an aspect of the present disclosure.

The processor 601 reads and executes the computer program instructions stored in the memory 602 to implement any of the methods for detecting the lithium precipitation of the battery in the above embodiments.

In an example, the apparatus for detecting the lithium precipitation of the battery may further include a communication interface 603 and a bus 609. As shown in FIG. 6, the processor 601, the memory 602, and the communication interface 603 are connected through the bus 609 and communicate mutually with each other.

The communication interface 603 is mainly configured to achieve communication between the modules, apparatuses, units and/or devices in the embodiments of the present application.

The bus 609 includes hardware, software, or both, and is configured to couple components of the device to each other. As an example but not as a limitation, the bus may include an Accelerated Graphics Port (AGP) or other graphics bus, an Enhanced Industry Standard Architecture (EISA) bus, a Front Side Bus (FSB), a HyperTransport (HT) interconnect, an Industry Standard Architecture (ISA) bus, an Infiniband interconnect, a Low Pin Count (LPC) bus, a memory bus, an Microchannel Architecture (MCA) bus, a Peripheral Component Interconnect (PCI) bus, a PCI-Express (PCI-X) bus, a Serial Advanced Technology Attachment (SATA) bus, a Video Electronics Standards Association Local (VLB) bus or any other suitable bus or a combination of two or more thereof. When appropriate, the bus 609 may include one or more buses. Although the embodiments of the present application describe and illustrate a particular bus, any suitable bus or interconnect is also anticipated in the present application.

The apparatus for detecting the lithium precipitation of the battery may perform the methods for detecting the lithium precipitation of the battery in the embodiments of the present application, thereby implementing the methods for detecting the lithium precipitation of the battery described with reference to the above embodiments.

In addition, the embodiments of the present application may provide a computer storage medium for implementing the methods for detecting the lithium precipitation of the battery in the above embodiments. The computer storage medium stores computer program instructions thereon which, when executed by the processor, implement any of the methods for detecting the lithium precipitation of the battery in the above embodiments.

In addition, the embodiments of the present application further provide a computer program product including a computer program which, when executed by a processor, may implement steps and corresponding contents of the foregoing embodiments of the method.

Although the present application has been described with reference to the optional embodiments, various modifications can be made thereto and components thereof can be replaced with their equivalents without departing from the scope of the present application. In particular, various technical features described in various embodiments can be combined in any manner as long as there is no structural conflict. The present application is not limited to the specific embodiments described herein, and includes all technical solutions that fall within the scope of the claims.

What is claimed is:

1. A method for detecting lithium precipitation of a battery, comprising:

Acquiring, by a pressure sensor arranged at a predetermined position of the battery, pressure data of the predetermined position of the battery; and detecting lithium precipitation of the battery according to the pressure data and reference pressure data, wherein the pressure data comprises actually measured pressure data of the battery, and the reference pressure data comprises pressure data related to a predetermined amount of lithium precipitation of the battery under a predetermined condition;

wherein the detecting lithium precipitation of the battery according to the pressure data and reference pressure data comprises:

comparing the pressure data to the reference pressure data; and detecting an amount of lithium precipitation of the battery based on a difference between the pressure data and the reference pressure data.

2. The method according to claim 1, wherein the predetermined condition comprises a predetermined temperature and a predetermined electricity amount, and the reference pressure data comprises pressure data related to the predetermined amount of lithium precipitation of the battery under the predetermined temperature and the predetermined electricity amount.

3. The method according to claim 1, wherein the detecting lithium precipitation of the battery according to the pressure data and reference pressure data comprises:

comparing the pressure data to the reference pressure data;

determining, under a condition that the pressure data is greater than the reference pressure data, that the battery is in a lithium precipitation state;

determining, under a condition that the pressure data is less than or equal to the reference pressure data, that the battery is in a non-lithium precipitation state.

4. The method according to claim 1, wherein the detecting the amount of lithium precipitation of the battery based on the difference between the pressure data and the reference pressure data comprises:

searching for an amount of lithium precipitation corresponding to the difference between the pressure data and the reference pressure data from a functional relationship between a pressure variation and an amount of lithium precipitation.

5. The method according to claim 4, wherein the functional relationship between the pressure variation and the amount of lithium precipitation is obtained by:

detecting an accumulated amount of lithium precipitation of a first test battery at different time instances and a pressure variation of a predetermined position of the first test battery when the accumulated amount of lithium precipitation is reached; and fitting the functional relationship between the pressure variation and the amount of lithium precipitation by using the accumulated amount of lithium precipitation of the first test battery at different time instances and the pressure variation of the predetermined position of the first test battery when the accumulated amount of lithium precipitation is reached.

6. The method according to claim 1, wherein the predetermined position comprises a plurality of predetermined positions, and each predetermined position corresponds to one reference pressure datum.

7. The method according to claim 1, wherein the reference pressure data is obtained by:

establishing a data matrix of the pressure data related to the predetermined amount of lithium precipitation under predetermined conditions, wherein the data matrix reflects a correspondence relationship between the predetermined conditions and the pressure data, the predetermined conditions comprising temperature and electricity amount; and obtaining a corresponding reference pressure data from the data matrix based on an actual measurement condition.

8. The method according to claim 7, wherein the establishing the data matrix of the pressure data related to the predetermined amount of lithium precipitation under the predetermined condition comprises:

collecting pressure data of a second test battery related to the predetermined amount of lithium precipitation under different predetermined conditions;

establishing, according to the pressure data under the different predetermined conditions, the data matrix of the pressure data related to the predetermined amount of lithium precipitation under the predetermined condition.

9. A system for detecting lithium precipitation of a battery, comprising:

an acquisition module, the acquisition module comprising a pressure sensor arranged at a predetermined position of the battery and configured to acquire pressure data of the predetermined position of the battery; and a detection module configured to detect lithium precipitation of the battery according to the pressure data and reference pressure data, wherein the pressure data comprises actually measured pressure data of the battery, and the reference pressure data comprises pressure data related to a predetermined amount of lithium precipitation of the battery under a predetermined condition;

wherein the detection module is configured to compare the pressure data to the reference pressure data; and detect an amount of lithium precipitation of the battery based on a difference between the pressure data and the reference pressure data.

10. An apparatus for detecting lithium precipitation of a battery, comprising a processor, a memory and programs or instructions stored on the memory and executable on the processor, wherein the programs or the instructions, when executed by the processor, implement steps of the method for detecting lithium precipitation of the battery according to claim 1.

11. An apparatus for detecting lithium precipitation of a battery, configured to perform steps of the method for detecting lithium precipitation of the battery according to claim 1.

12. A non-transitory machine-readable storage medium having instructions stored thereon, wherein the instructions when executed by a processor, implement steps of the method for detecting lithium precipitation of the battery according to claim 1.

* * * * *